US012365573B2

(12) United States Patent
Minobe

(10) Patent No.: US 12,365,573 B2
(45) Date of Patent: Jul. 22, 2025

(54) FLOOR SURFACE INCLINATION HANDLING METHOD, AND FLOOR SURFACE INCLINATION HANDLING SYSTEM

(71) Applicant: Mitsubishi Logisnext Co., Ltd., Kyoto (JP)

(72) Inventor: Atsushi Minobe, Kyoto (JP)

(73) Assignee: Mitsubishi Logisnext Co., Ltd., Kyoto (JP)

(*) Notice: Subject to any disclaimer, the term of this patent is extended or adjusted under 35 U.S.C. 154(b) by 154 days.

(21) Appl. No.: 18/448,973

(22) Filed: Aug. 14, 2023

(65) Prior Publication Data

US 2024/0383735 A1 Nov. 21, 2024

(30) Foreign Application Priority Data

May 15, 2023 (JP) ................................. 2023-079953

(51) Int. Cl.
*B66F 9/00* (2006.01)
*B66F 9/06* (2006.01)
*B66F 17/00* (2006.01)

(52) U.S. Cl.
CPC ............ *B66F 17/003* (2013.01); *B66F 9/063* (2013.01)

(58) Field of Classification Search
None
See application file for complete search history.

(56) References Cited

U.S. PATENT DOCUMENTS

2009/0206589 A1* 8/2009 Osswald ................ B62D 21/14 187/234
2022/0089420 A1* 3/2022 Faimali ................. B66F 9/0755
2022/0262132 A1* 8/2022 Takao ...................... B66F 9/063
2022/0274525 A1* 9/2022 Ishizaki ................ B66F 9/0755
2023/0072784 A1* 3/2023 Song ........................ F15B 13/02
2024/0067510 A1* 2/2024 Ulbrich .................... B66F 9/063
2024/0169311 A1* 5/2024 Neema ................. G06Q 10/087

FOREIGN PATENT DOCUMENTS

DE 102021211708 4/2023
JP 2023007817 1/2023

OTHER PUBLICATIONS

"Office Action of Europe Counterpart Application", issued on Oct. 10, 2024, pp. 1-3.
"Search Report of Europe Counterpart Application", issued on Mar. 1, 2024, p. 1-p. 6.

* cited by examiner

*Primary Examiner* — James M McPherson
(74) *Attorney, Agent, or Firm* — JCIPRNET

(57) ABSTRACT

An inclination handling method and system are provided. An unmanned forklift automatically measures inclination of floor surface at a stop position where it stops when loading, and, if necessary, shifts a travel center of the forklift at the stop position. The method includes: automatically measuring an inclination angle on floor surface in a left-right direction of the rack at the stop position using an inclinometer when the forklift loads a first tier of a multi-tiered rack at the stop position; determining whether a correction is necessary to shift a travel center of the unmannered forklift in the left-right direction of the rack at the stop position using measurement results; and when it is determined that the correction is necessary at the stop position, shifting the travel center at the stop position when the forklift loads a second tier or higher of the multi-tiered rack at the stop position.

9 Claims, 6 Drawing Sheets

FLOOR SURFACE INCLINATION HANDLING METHOD, AND FLOOR SURFACE INCLINATION HANDLING SYSTEM

CROSS-REFERENCE TO RELATED APPLICATION

This application claims the priority benefits of Japanese application no. 2023-079953, filed on May 15, 2023. The entirety of the above-mentioned patent application is hereby incorporated by reference herein and made a part of this specification.

BACKGROUND

Technical Field

The disclosure relates to a method and system for handling floor surface inclination at a stop position when an unmanned forklift loads a multi-tiered rack.

Related Art

An unmanned forklift is provided with an optical sensor such as LiDAR. By measuring the distance to a surrounding object to identify its own position and the positional relationship between itself and the load (pallet), the unmanned forklift automatically travels and performs load placing operation. For example, an unmanned forklift travels along a predetermined route, stops in front of a multi-tiered rack, and performs load operation on the multi-tiered rack.

If the floor surface is inclined to the left or right at the stop position where the unmanned forklift stops when loading on a multi-tiered rack, there is a risk of the load contacting the columns of the rack or an already placed load.

The method disclosed in Patent Literature 1 measures whether the floor surface is inclined in the left-right direction in advance so as to avoid such a risk of contact.

Specifically, according to this method, the operator first installs a dedicated floor surface measurement jig (see FIG. 2 of Patent Literature 1) at the stop position and measures the inclination angle of the floor surface at that stop position in the left-right direction of the rack using an inclinometer of the jig. The operator performs similar measurements for all stop positions within the operation area and obtains measured values for all stop positions in the operation area. Moreover, the operator identifies stop positions where the inclination angle of the floor surface exceeds a predetermined threshold value based on the measured values.

Further, according to the method, a command value of the unmanned forklift is corrected such that the travel center is deviated in the left-right direction at stop positions where the inclination angle exceeds a predetermined threshold value. As a result, when the unmanned forklift loads the rack at that stop position, the load is placed away from the columns of the rack and already placed neighboring load. In this manner, it is possible to avoid contact between loads or contact between load and the columns of the rack.

As described above, the method of Patent Literature 1 requires an operator to actually install a jig at the stop position and perform measurements. There is a possibility that the installation position of the jig may be deviated, preventing accurate measurement of the inclination angle, and errors may occur due to visual judgment. Moreover, it is burdensome for the operator to perform such measurements for each and every stop position in the unmanned forklift's operation area, and it incurs costs as personnel for measurement need to be provided.

CITATION LIST

Patent Literature

Patent Literature 1: Japanese Patent Application Laid-Open No. 2023-7817

Technical Problem

The present application automatically measures the floor surface inclination at the stop position where the unmanned forklift stops when loading, and, if necessary, shift the travel center of the unmanned forklift at that stop position.

SUMMARY

Solution to Problem

In the present application, a floor surface inclination handling method is provided for handling inclination of a floor surface at a stop position where an unmanned forklift stops when loading on a multi-tiered rack, the method includes:

when the unmanned forklift loads a N-th tier (N is a natural number equal to or greater than 1) of the multi-tiered rack at the stop position, an inclination angle of the floor surface at the stop position in a left-right direction of the rack is automatically measured, using an inclinometer provided on the unmanned forklift;

whether a correction to shift a travel center of the unmanned forklift in the left-right direction of the rack at the stop position is necessary is determined, using measurement results;

when it is determined that the correction is necessary at the stop position, which one of the left-right direction of the rack is a shift direction of the travel center at the stop position is determined; and when it is determined that the correction is necessary at the stop position, the travel center at the stop position is shifted when the unmanned forklift loads a N+1 tier or higher of the multi-tiered rack at the stop position, in the decided shift direction.

According to the present application, there is further provided a floor surface inclination handling system for handling inclination of a floor surface at a stop position where an unmanned forklift stops when loading on a multi-tiered rack, the system includes:

an inclinometer provided on the unmanned forklift for measuring an inclination angle of the floor surface;

a measurement execution part that automatically measures the inclination angle in a left-right direction of the rack at the stop position when the unmanned forklift loads a Nth tier (N is a natural number equal to or greater than 1) of the multi-tiered rack at the stop position, using the inclinometer;

a determination part that determines whether a correction to shift a travel center of the unmanned forklift in the left-right direction of the rack is necessary at the stop position, based on measurement results of the measurement execution part;

a decision part that decides, when the determination part determines that the correction is necessary at the stop position, a correction value for a command value of the unmanned forklift related to the travel center at the stop position, based on the measurement results of the measurement execution part; and a correction part that corrects, when the determination part determines that the correction is necessary at the stop position, the command value with the correction value decided by the decision part such that when the unmanned forklift loads a N+1 tier or higher of the multi-tiered rack at the stop position, the travel center of the unmanned forklift is deviated in the left-right direction of the rack at the stop position.

BRIEF DESCRIPTION OF THE DRAWINGS

A of FIG. 1 is a front view of an exemplary multi-tiered rack R, and B of FIG. 1 is a side view of A of FIG. 1.

A of FIG. 2 is a schematic side view of an exemplary unmanned forklift, and B of FIG. 2 is a plan view of A of FIG. 2.

DESCRIPTION OF THE EMBODIMENTS

Figure 1:
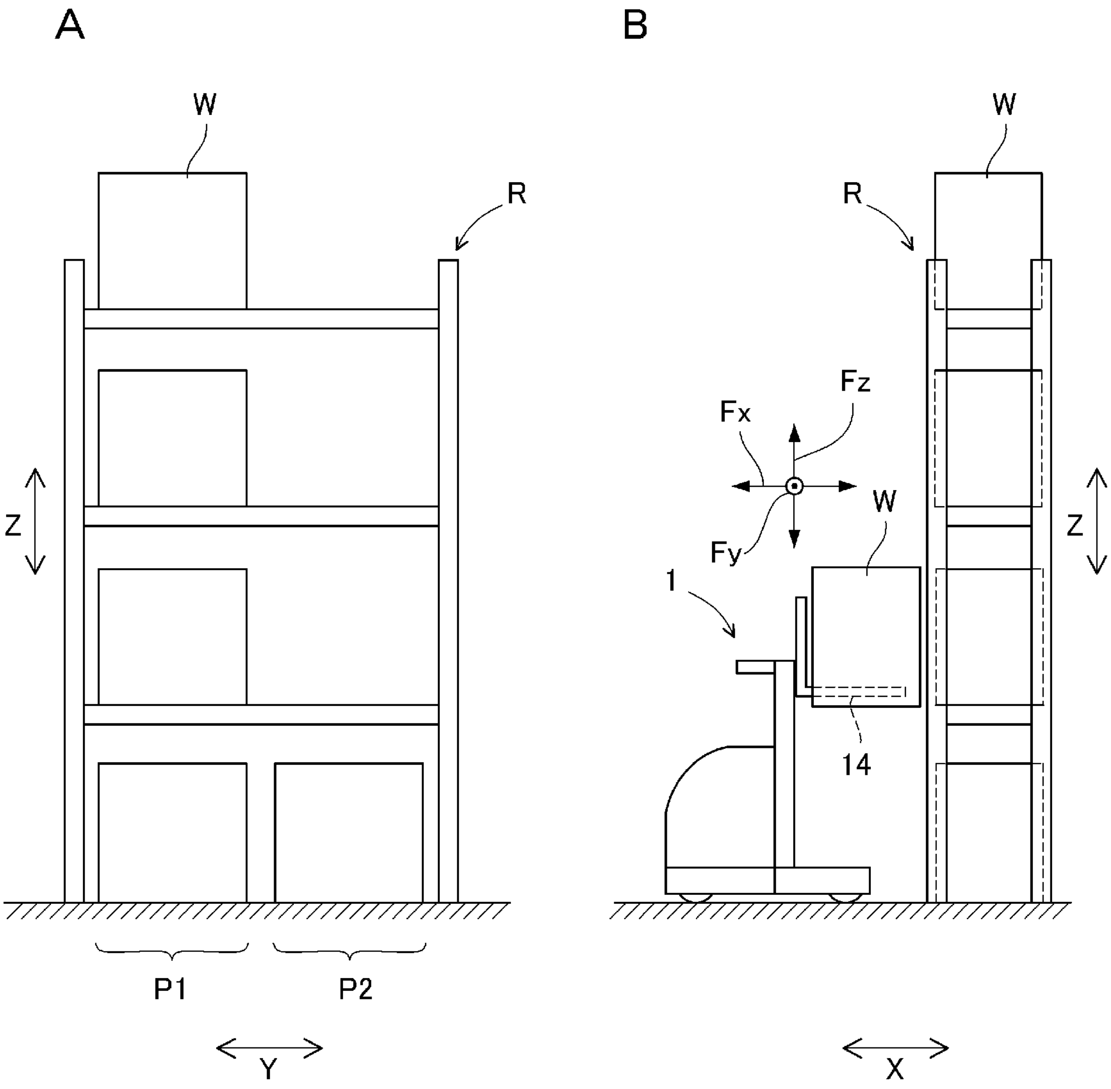

The method further includes:

when it is determined that the correction is necessary at the stop position, a shift amount of the travel center at the stop position is decided, using the measurement results.

when it is determined that the correction is necessary at the stop position, the travel center at the stop position is shifted when the unmanned forklift loads the N+1 tier or higher of the multi-tiered rack at the stop position, in the decided shift direction by the decided shift amount only.

The inclinometer may be arranged inside a vehicle body of the unmanned forklift to measure an inclination angle of the vehicle body in a left-right direction. Furthermore, the determination part may be configured to output a warning when the measured inclination angle exceeds a threshold value.

In the above, preferably, N is 1 or 2, and more preferably, N is 1.

Hereinafter, an exemplary embodiment of the present application will be described with reference to the drawings. Note that the structural elements illustrated in the drawings are not necessarily accurate in dimensions or ratios, and merely represent their functions or operations.

[Multi-Tiered Rack]

A and B of FIG. 1 schematically illustrate an exemplary multi-tiered rack provided in the operation area of an unmanned forklift. This exemplary multi-tiered rack R (hereinafter simply referred to as rack R) is a four-tier, two-row rack. That is, in each tier, two regions to place loads W (hereinafter referred to as placement regions) are defined in a left-right direction Y of the rack (hereinafter simply referred to as direction Y). And in each row, four placement regions are defined in an up-down direction Z (simply, direction Z). Direction X is a depth direction of the rack. Also, for each row, stop positions P1 and P2 are defined where an unmanned forklift 1 stops when loading the rack R. In an actual operation area, since there are a plurality of such multi-tiered racks R provided, a plurality of stop positions (P1, P2, . . . ) are defined. Note that illustrated loads W collectively represent the actual load and the pallet on which the load is placed.

[Unmanned Forklift]

Figure 2:
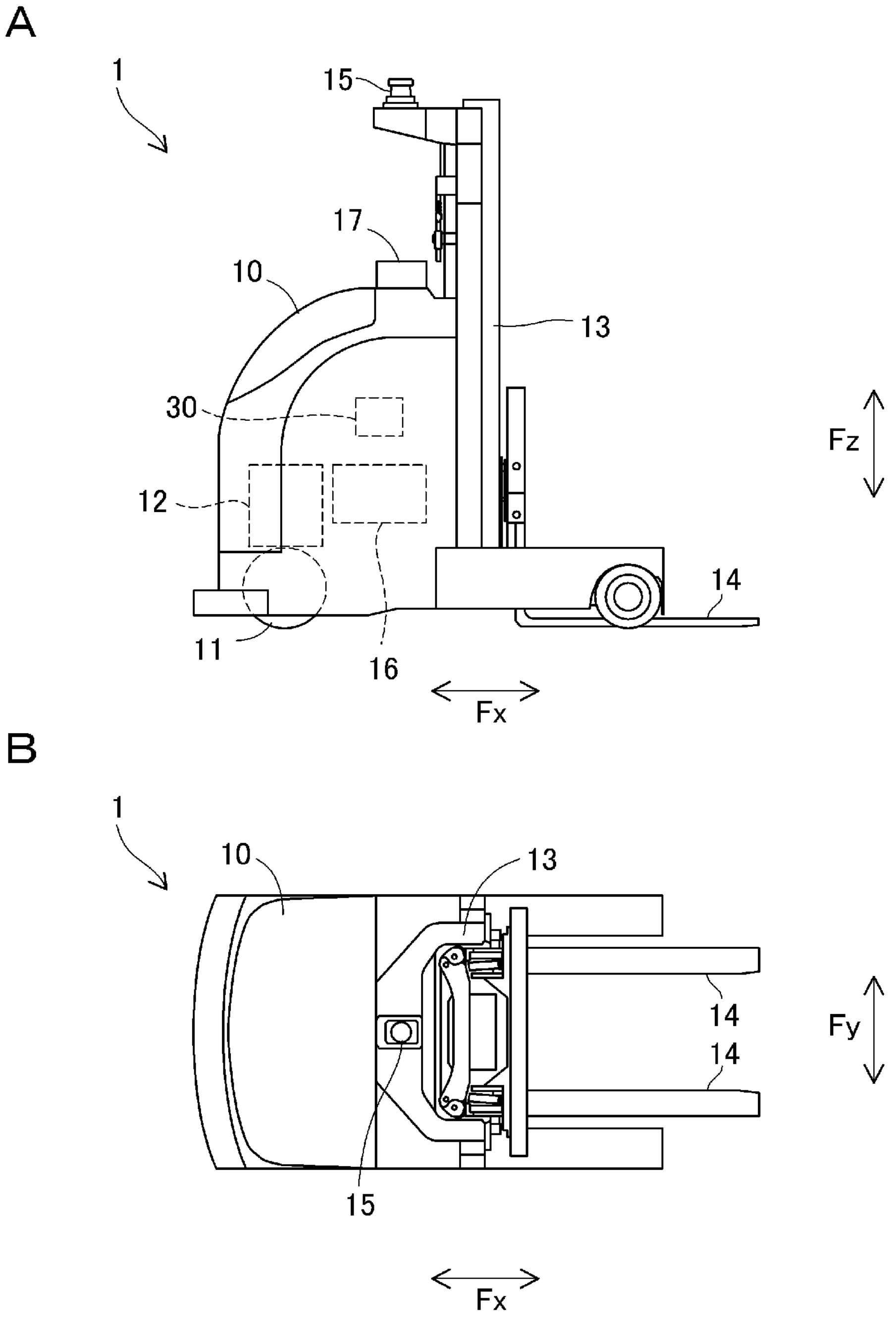

A and B of FIG. 2 illustrate the exemplary unmanned forklift 1. The unmanned forklift 1 includes a vehicle body 10, traveling wheels 11, a traveling device 12, a load handling device 13, and forks 14. The traveling device 12 drives the traveling wheels 11, thereby causing the vehicle body 10 to travel. The load handling device 13 is composed of a mast device, a reach device, etc. A left and right pair of forks 14 are inserted into the pallet of the load W and serve to support the load W. The load handling device 13 may move the left and right pair of forks 14 in an up-down direction Fz and in a forward-backward direction Fx.

The unmanned forklift 1 further includes an optical sensor 15 and an operation controller 16. The optical sensor 15 is, for example, LiDAR, which measures the distance between objects and the surroundings. The operation controller 16 is realized, for example, by a CPU executing a program stored in a storage medium. Based on the measurements of the optical sensor 15, the operation controller 16 identifies the position of the unmanned forklift 1 and the positional relationship between the unmanned forklift 1 and the load W (pallet), and based on this, controls the traveling device 12 and the load handling device 13. With the operation controller 16, the unmanned forklift 1 may travel along a travel path within an operation area according to a predetermined operation program and perform load handling operation on the rack R.

Specifically, the unmanned forklift 1 travels along a predetermined travel path, stops at a stop position in front of the rack R so as to face the rack R (i.e. such that the direction X and direction Fx substantially align, and the direction Y and a direction Fy substantially align), and may place the load W at the placement position of any tier of the rack R at that stop position. Moreover, B of FIG. 1 illustrates the situation where the unmanned forklift 1 stops at the stop position P2 (A of FIG. 1) in a state where the forks 14 are inserted into the pallet of the load W and the load W is supported by the forks 14, and is about to begin moving the forks 14 to place the load W onto the placement position of the second tier of the rack R.

[Effect of Floor Surface Inclination]

Figure 3:
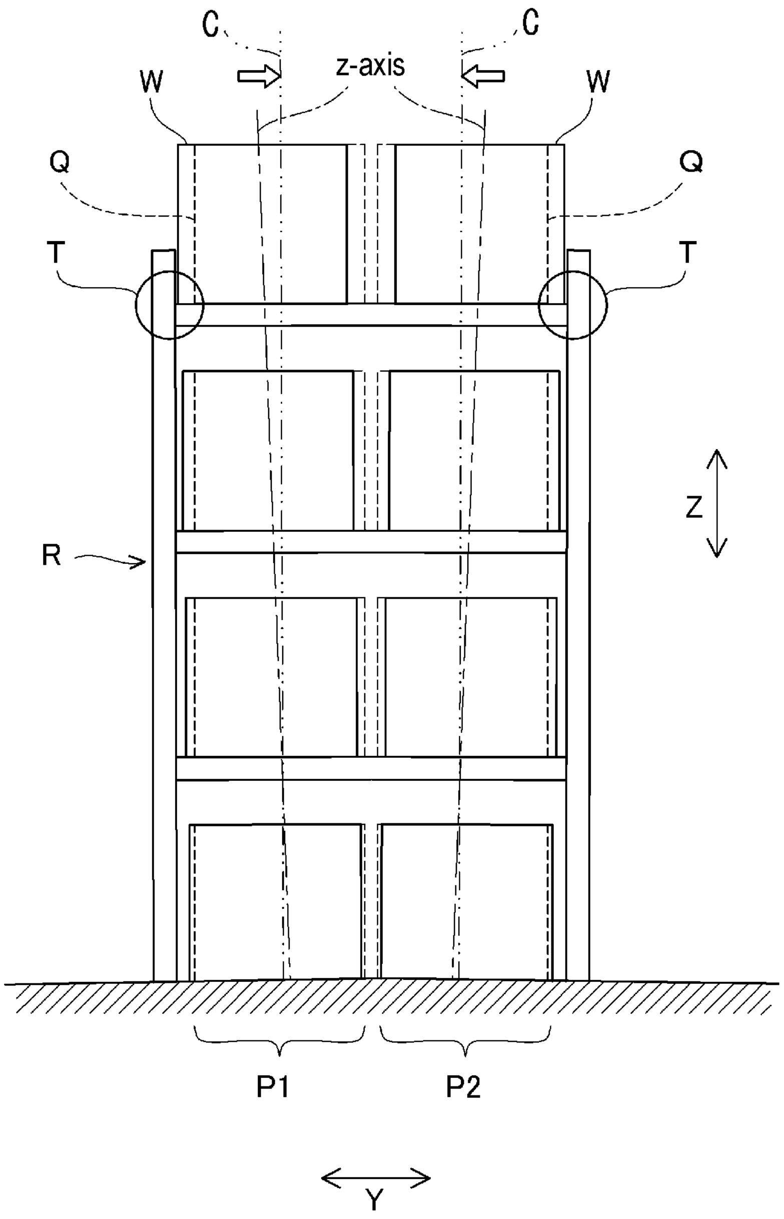
FIG. 3 illustrates the risk of contact of a load due to the floor surface inclination.

FIG. 3 illustrates an example where the floor surface is inclined downward to the left at the stop position P1 and inclined downward to the right at the stop position P2. In this state, the z-axis at the stop position P1 is inclined to the left, and the z-axis at the stop position P2 is inclined to the right. When the unmanned forklift 1 actually loads the rack R at the stop position P1, it places the load W to the left of a target placement position Q indicated by the dotted line. When the unmanned forklift 1 actually loads the rack R at the stop position P2, it places the load W to the right of the target placement position Q. Thus, when the unmanned forklift 1 loads the rack R at the stop position P1 and the stop position P2, there is a risk that the loads W will come into contact with the columns of the rack R as indicated in regions T.

For example, in order to avoid contact between the loads W and the rack R in FIG. 3, the command value of the unmanned forklift 1 should be corrected such that the travel center (travel line) of the unmanned forklift 1 at the stop position P1 is deviated to the right (see corrected travel center C), thereby allowing the unmanned forklift 1 to place the load W away from the columns of the rack R. Also, at the stop position P2, the travel center should be shifted to the left.

Figure 4:
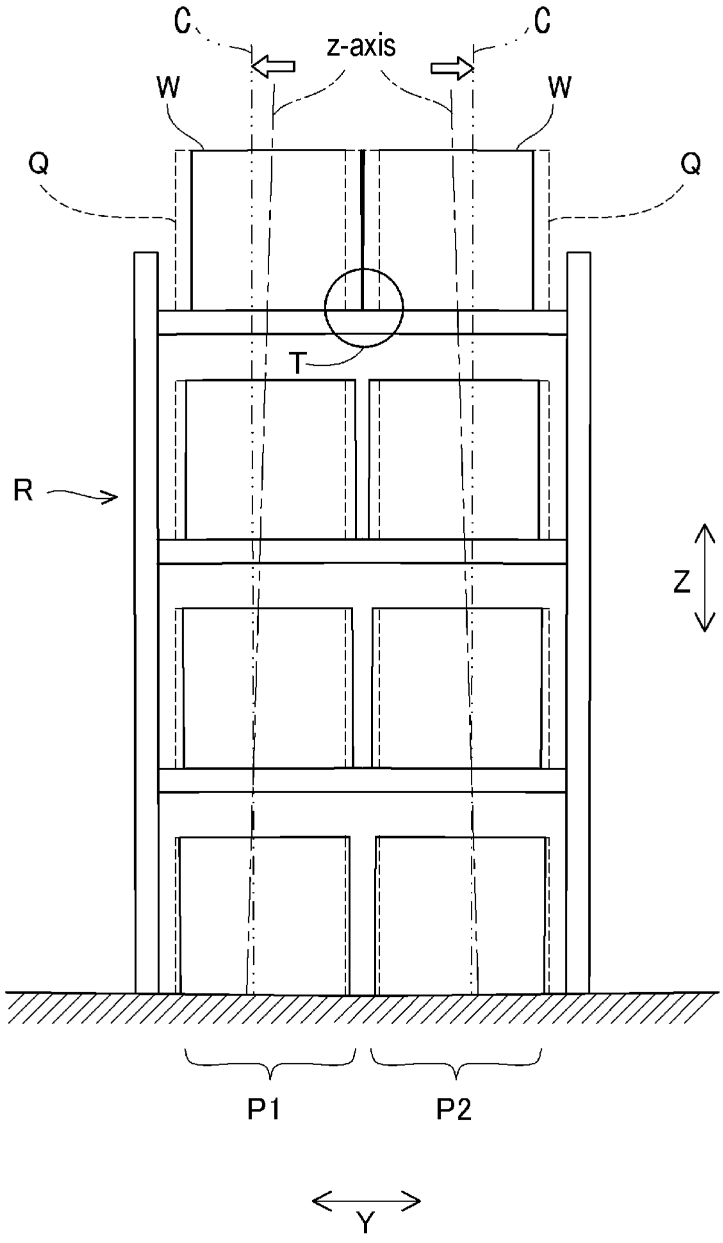
FIG. 4 illustrates the risk of contact of a load due to the floor surface inclination.

FIG. 4 illustrates an example where the floor surface is inclined downward to the right at the stop position P1 and inclined downward to the left at the stop position P2. In this state, the z-axis at the stop position P1 is inclined to the right, and the z-axis at the stop position P2 is inclined to the left. When the unmanned forklift 1 actually loads the rack R at the stop position P1, it places the load W to the right of the target placement position Q, and when it actually loads the rack R at the stop position P2, it places the load W to the left of the target placement position Q. Thus, when the unmanned forklift 1 loads at the stop position P1 or the stop position P2, there is a risk that the load W will come into contact with another load W already placed in the adjacent placement space as indicated in the region T.

For example, in order to avoid contact between loads W in FIG. 4, the command value of the unmanned forklift 1 should be corrected such that the travel center of the unmanned forklift 1 at the stop position P1 should be deviated to the left (see corrected travel center C), thereby allowing the unmanned forklift 1 to place the load away from the load W already placed on the stop position P2 side. Also, at the stop position P2, the travel center should be shifted to the right.

[Inclination Handling Method and System]

Figure 5:
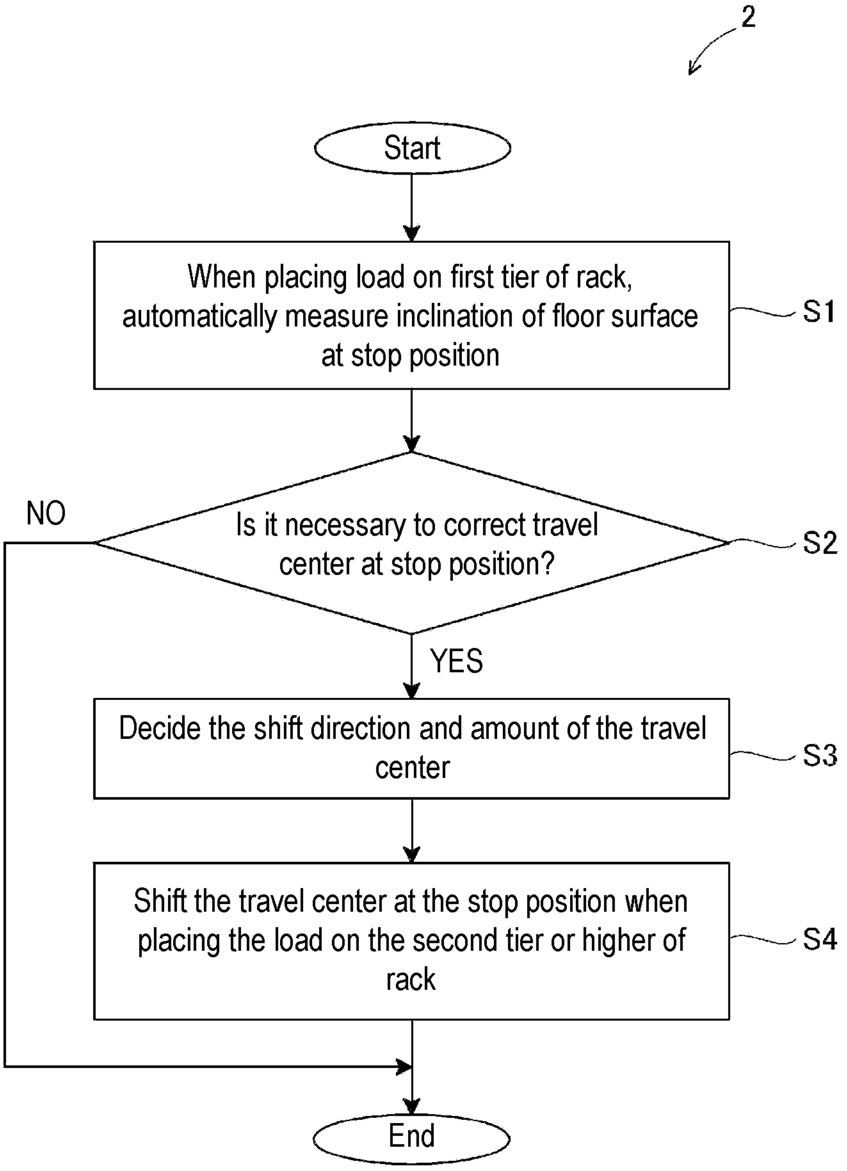
FIG. 5 is a diagram illustrating the flow of an exemplary floor surface inclination handling method.
Figure 6:
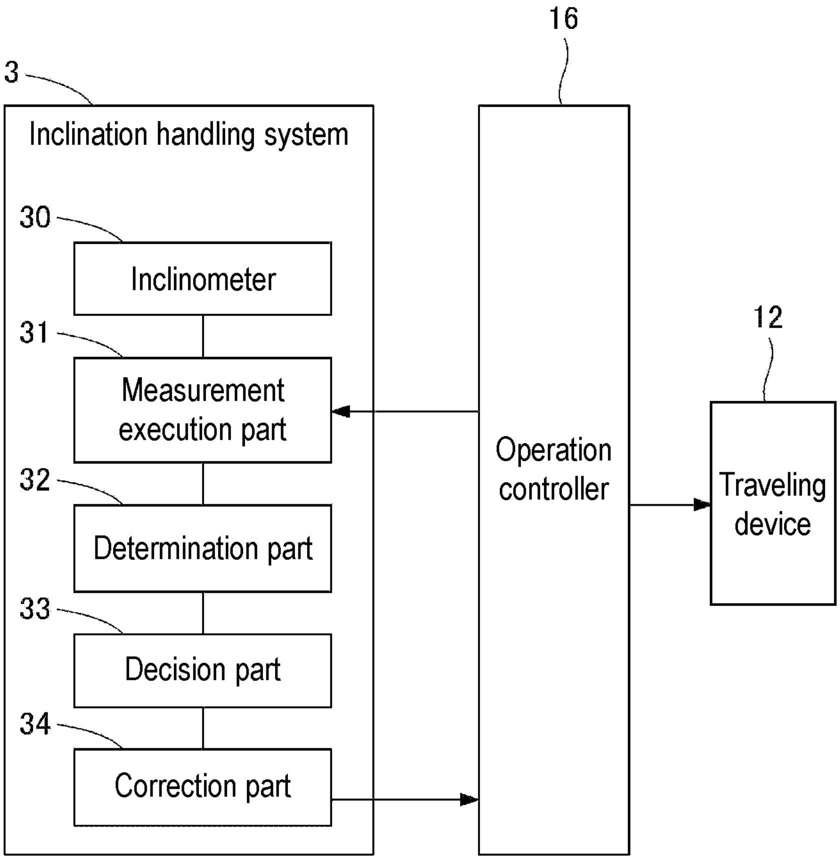
FIG. 6 is a block diagram of an exemplary floor surface inclination handling system.

Hereinafter, an exemplary inclination handling method 2 (FIG. 5) (hereinafter simply referred to as method 2) and an inclination handling system 3 (FIG. 6) (hereinafter simply referred to as system 3) for shifting the travel center in response to such floor surface inclination will be described.

Method 2 includes steps S1 to S4. The system 3 includes an inclinometer 30, a measurement execution part 31, a determination part 32, a decision part 33, and a correction part 34. The functional units 31 to 34 of the system 3 are realized, for example, by a CPU executing a program stored in a storage medium.

In step S1, when the unmanned forklift 1 loads the first tier of the rack R at a stop position, the inclination angle of the floor surface in the direction Y at that stop position is automatically measured by the inclinometer 30 provided on the unmanned forklift 1.

In order to carry out step S1, the inclinometer 30 and the measurement execution part 31 are used. Specifically, as illustrated in A of FIG. 2, the inclinometer 30 is provided inside the vehicle body 10 and is arranged to measure the inclination angle of the vehicle body 10 in a left-right direction Fy. The inclinometer 30 may measure whether the inclination is downward to the right or downward to the left depending on the measured value is positive or negative.

The measurement execution part 31 measures the inclination angle of the vehicle body 10 in the left-right direction Fy of the unmanned forklift 1 using the inclinometer 30 during the load placing operation on the first tier of the rack R at the stop position by the unmanned forklift 1, and thereby measures the inclination angle of the floor surface in the direction Y at that stop position.

As described above, the operation controller 16 identifies the position of the unmanned forklift 1 using the optical sensor 15 and drives the unmanned forklift 1. Thus, the measurement execution part 31 is able to recognize that the unmanned forklift 1 is at the stop position. Here, as illustrated in B of FIG. 1, the unmanned forklift 1 stops at the stop position such that its left-right direction Fy aligns with the left-right direction Y of the rack. Thus, the inclination angle indicated by the inclinometer 30 when the unmanned forklift 1 is stopped at the stop position corresponds to the inclination angle of the floor surface in direction Y at that stop position. Thus, by using the inclinometer, the measurement execution part 31 enables automatic measurement of the inclination angle of the floor surface at that stop position.

As such, in step S1, the unmanned forklift 1 is made to actually place a load on the first tier of the rack R at the stop position, and during that time, the inclination angle of the floor surface in direction Y at that stop position is automatically measured using the inclinometer 30.

This automatic measurement of the inclination angle of the floor surface in direction Y is similarly performed for each stop position (P1, P2, . . . ), and the inclination angles at each stop position (P1, P2, . . . ) are obtained.

Step S2 determines whether a correction to shift the travel center is necessary or not at the stop position, using the measurement results obtained in step S1.

The determination part 32 may be used to carry out step S2. The determination part 32 determines whether the inclination angle (its absolute value) at the stop position exceeds a predetermined threshold value (for example, 0.1 degrees as in Patent Literature 1).

The determination part 32 may determine that no correction is necessary at the stop position when the measured inclination angle does not exceed the predetermined threshold value. When the determination part 32 finds that the measured inclination angle exceeds the predetermined threshold value, it may output a warning. Moreover, a display device 17 of the unmanned forklift 1 (see A of FIG. 2) and a display device of the operators in the operation area (not shown) may display the warning when receiving the output of the warning. As a result, the operator may know that the floor surface is inclined beyond the threshold value at that stop position.

The determination part 32 may determine that a correction is necessary at the stop position when the inclination angle exceeds the predetermined threshold value at the stop position. Further, as in Patent Literature 1, for example, the determination part 32 may determine that a correction is necessary at each of the stop positions P1 and P2 when the inclination angles at the two adjacent stop positions P1 and P2 exceed the threshold value, and a predetermined inclination pattern (for example, a pattern where the z-axes of the two stop positions P1 and P2 form an inverted V-shape as shown in FIG. 4) is detected at the two stop positions P1 and P2.

A determination is made as to whether a correction is necessary for all stop positions (P1, P2, . . . ). The determination method in step S2 and by the determination part 32 is not limited to the above examples, and various methods may be employed. Hereinafter, a stop position determined to require a correction of the travel center may be referred to as a "correction-required position".

In step S3, if it is determined in step S2 that a correction of the travel center is necessary at the stop position, which one of the shift direction in which the travel center of the unmanned forklift 1 at that stop position (the left or right side) in the Y direction should be moved is decided.

As previously mentioned, the inclinometer 30 also indicates the direction of the inclination. Thus, in step S3, using the measurement results obtained by the measurement execution part 31 in step S1, it is decided to shift the travel center to the right when the floor surface is sloping downward to the left at the correction-required position, and decided to move the travel center to the left when the floor surface is sloping downward to the right.

Further, step S3 decides the shift amount for the travel center at the correction-required position based on the measurement results. Since the larger the inclination angle of the floor surface, the greater the inclination of the z-axis, in step S3, the larger the inclination angle (its absolute value), the greater the shift amount may be. Also, the deviation of the actual placement position of the load W from the target placement position Q tends to increase as the number of rack R tiers increases. Thus, in step S3, at the same correction-required position, the travel center's shift amount may be increased as the number of rack R tiers increases. For example, in step S3, at the same correction-required position, the shift amount may be set to 10 mm to the right when loading on the second tier of rack R, the shift amount may be set to 20 mm to the right when loading on the third tier, and the shift amount may be set to 30 mm to the right when loading on the fourth tier. Alternatively, in step S3, at the same correction-required position, regardless of the tier above the second tier, a uniform shift amount of 20 mm to the right may be decided for all tiers. Step S3 may decide the necessary shift amount to avoid load collisions using both measurement results and rack structure information.

The system 3 uses the decision part 33 to perform the above-mentioned step S3. The decision part 33 decides a correction value for the command value of the unmanned forklift 1 related to the travel center and corresponding to the shift amount and shift direction by calculation, using the measurement results obtained by the measurement execution part 31.

The same process is performed for all correction-required positions. The decision methods of the shift amount, shift direction, and correction value by step S3 and the decision part 33 are not limited to the examples described above, and various methods may be adopted.

In step S4, when it is determined that a correction to shift the travel center is necessary at the stop position, the travel center at the stop position where the unmanned forklift 1 loads the second tier or higher of the rack R at that stop position is shifted by the shift direction and shift amount decided in step S3.

The correction part 34 is used to perform step S4. The correction part 34 corrects the command value of the unmanned forklift when loading on the second tier or higher at the correction-required position, based on the correction value decided by the decision part 33. As a result, the operation controller 16 of the unmanned forklift 1 controls the traveling device 12 with the corrected command value to drive the unmanned forklift 1. Thus, when the unmanned forklift 1 stops at the correction-required position to perform load placing operation at the second tier or higher, at that correction-required position, the travel center is deviated by the shift direction and shift amount decided in step S3 (see corrected travel center C in FIGS. 3 and 4).

For example, in steps S1 to S3, it is determined that the stop position P1 is not a correction-required position and the stop position P2 is a correction-required position, and the shift amount and shift direction (correction value for the command value at the stop position) at the stop position P2 are decided. In this case, Method 2 does not shift the travel center at the stop position P1 when the unmanned forklift 1 loads the second tier or higher at the stop position P1. In other words, Method 2 does not perform a correction of the travel center.

On the other hand, Method 2 involves shifting the travel center of the stop position 2 of the unmanned forklift 1 when it stops at the stop position P2 and loads the second tier, third tier, and fourth tier, in a direction to avoid the risk of contacting the load W. In this manner, a correction to shift the travel center is performed only for the second tier or higher of the rack R as needed.

As described above, in the embodiment, the inclinometer 30 provided on the unmanned forklift 1 automatically measures the inclination angle in the Y direction of the floor surface at the stop position during the load placing operation for the first tier of the rack R at the stop position by the unmanned forklift 1. Moreover, only when loading on the second tier or higher of the rack R, the travel center at the stop position is shifted left or right to avoid contact between loads W and between the load W and the rack R as necessary.

In this manner, the embodiment eliminates the need for a dedicated measuring jig that simulates the wheelbase of an unmanned forklift as disclosed in Patent Literature 1, and the need for human measurement operation using such a jig. When measurements are conducted by human, the installation position of the jig is often deviated, and since visual judgment is performed, the measured value often does not reflect the accurate floor inclination angle of the floor surface. In contrast, the embodiment automatically measures the inclination angle of the floor surface while the unmanned forklift 1 is actually operating in the operation area and is performing operation at the stop position, resulting in accurate measured values. Further, the embodiment also reduces costs by eliminating the need to prepare measurement personnel.

It should be noted that, not limited to the first tier of the rack R as in the embodiment, the inclination angle of the floor surface in the direction Y at the stop position may be measured during the load placing operation on a tier with a relatively low risk of contact with the rack R or other loads W, for example, during the load placing operation on the second tier of the rack R, and may shift the travel center during load placement only for the third tier or higher at that stop position as necessary.

The functional parts 31 to 34 of the system 3 may be provided on the unmanned forklift 1, or some or all of them may be provided on a device (for example, a server device that manages the operation area) that is capable of communicating wirelessly with the unmanned forklift 1.

What is claimed is:

1. A floor surface inclination handling method for handing inclination of a floor surface at a stop position where an unmanned forklift stops when loading on a multi-tiered rack, the method comprising:

- when the unmanned forklift loads a N-th tier (N is a natural number equal to or greater than 1) of the multi-tiered rack at the stop position, automatically measuring an inclination angle of the floor surface at the stop position in a left-right direction of the rack, using an inclinometer provided on the unmanned forklift;
- determining, using measurement results, whether a correction to shift a travel center of the unmanned forklift in the left-right direction of the rack at the stop position is necessary;
- deciding, when it is determined that the correction is necessary at the stop position, which one of the left-right direction of the rack is a shift direction of the travel center at the stop position; and
- when it is determined that the correction is necessary at the stop position, shifting the travel center at the stop position when the unmanned forklift loads a N+1-th tier or higher of the multi-tiered rack at the stop position, in the decided shift direction.

2. The floor surface inclination handling method according to claim 1, further comprising:

deciding, when it is determined that the correction is necessary at the stop position, a shift amount of the travel center at the stop position, using the measurement results, and shifting, wherein when it is determined that the correction is necessary at the stop position, the travel center at the stop position when the unmanned forklift loads the N+1-th tier or higher of the multi-tiered rack at the stop position, in the decided shift direction by the decided shift amount only.

3. The floor surface inclination handling method according to claim 1, wherein N is 1 or 2.

4. The floor surface inclination handling method according to claim 1, wherein the N is 1.

5. A floor surface inclination handling system for handling inclination of a floor surface at a stop position where an unmanned forklift stops when loading on a multi-tiered rack, the system comprising:

an inclinometer provided on the unmanned forklift for measuring an inclination angle of the floor surface; and a processor configured to:

automatically measure the inclination angle in a left-right direction of the rack at the stop position when the unmanned forklift loads a N-th tier (N is a natural number equal to or greater than 1) of the multi-tiered rack at the stop position, using the inclinometer;

determine whether a correction to shift a travel center of the unmanned forklift in the left-right direction of the rack is necessary at the stop position, based on measurement results of the measurement execution part;

decide, when the determination part determines that the correction is necessary at the stop position, a correction value for a command value of the unmanned forklift related to the travel center at the stop position, based on the measurement results of the measurement execution part; and correct, when the determination part determines that the correction is necessary at the stop position, the command value with the correction value decided by the decision part such that when the unmanned forklift loads a N+1-th tier or higher of the multi-tiered rack at the stop position, the travel center of the unmanned forklift is deviated in the left-right direction of the rack at the stop position.

6. The floor surface inclination handling system according to claim 5, wherein the inclinometer is arranged inside a vehicle body of the unmanned forklift to measure an inclination angle of the vehicle body in a the left-right direction.

7. The floor surface inclination handling system according to claim 5 wherein the processor is configured to output a warning when the measured inclination angle exceeds a threshold value.

8. The floor surface inclination handling system according to claim 5, wherein the N is 1 or 2.

9. The floor surface inclination handling system according to claim 5, wherein the N is 1.

* * * * *